United States Patent Office 3,077,290
Patented Feb. 12, 1963

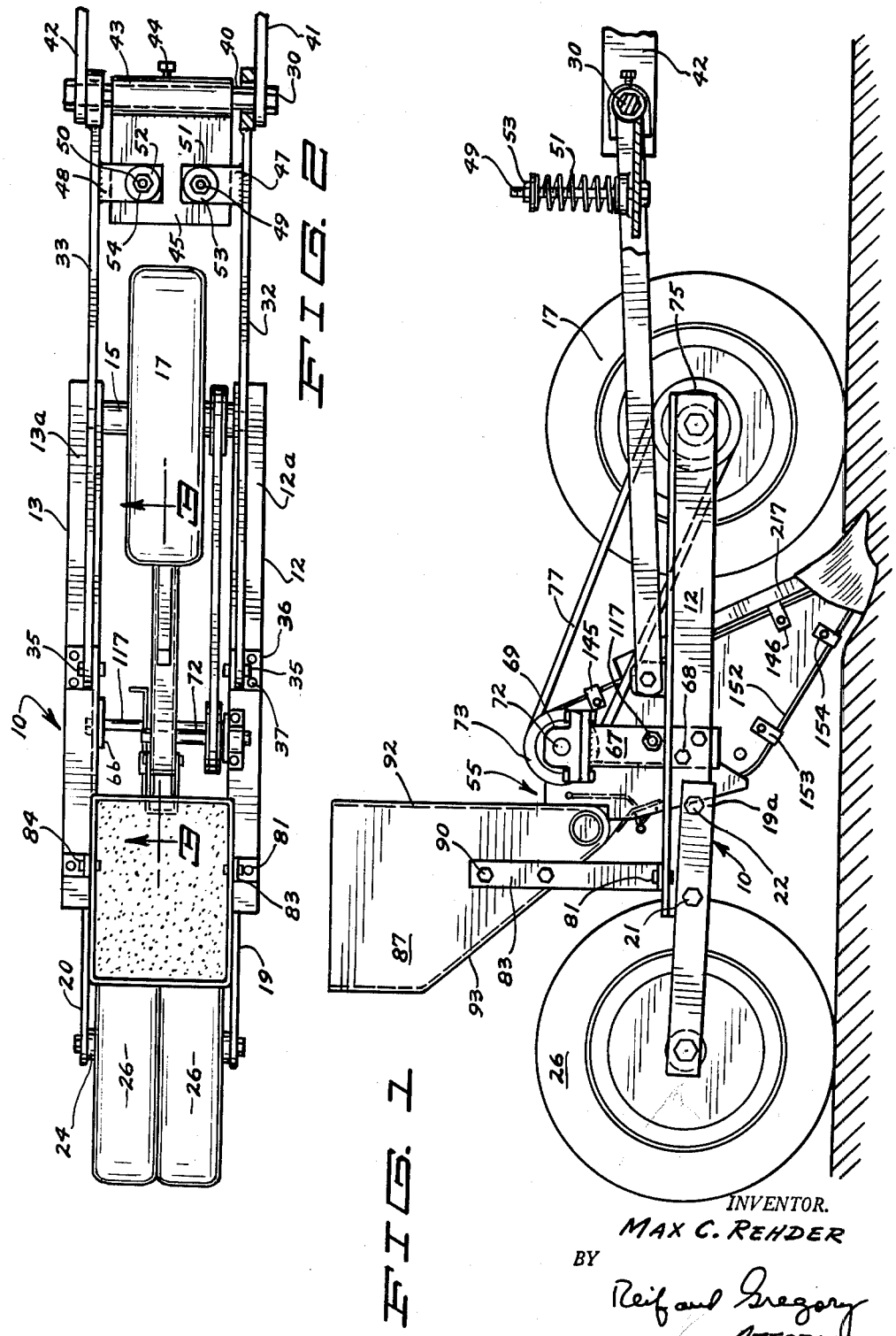

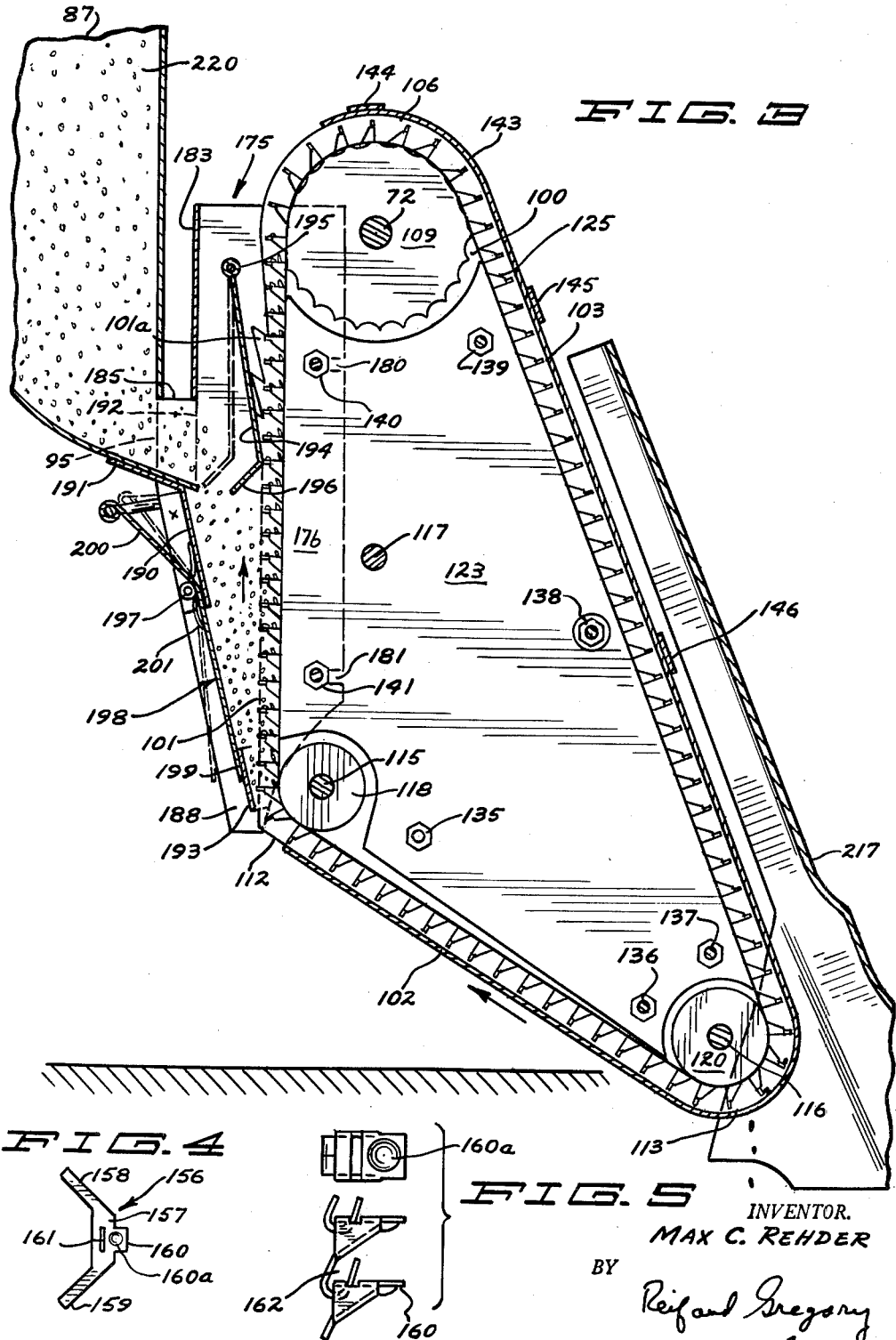

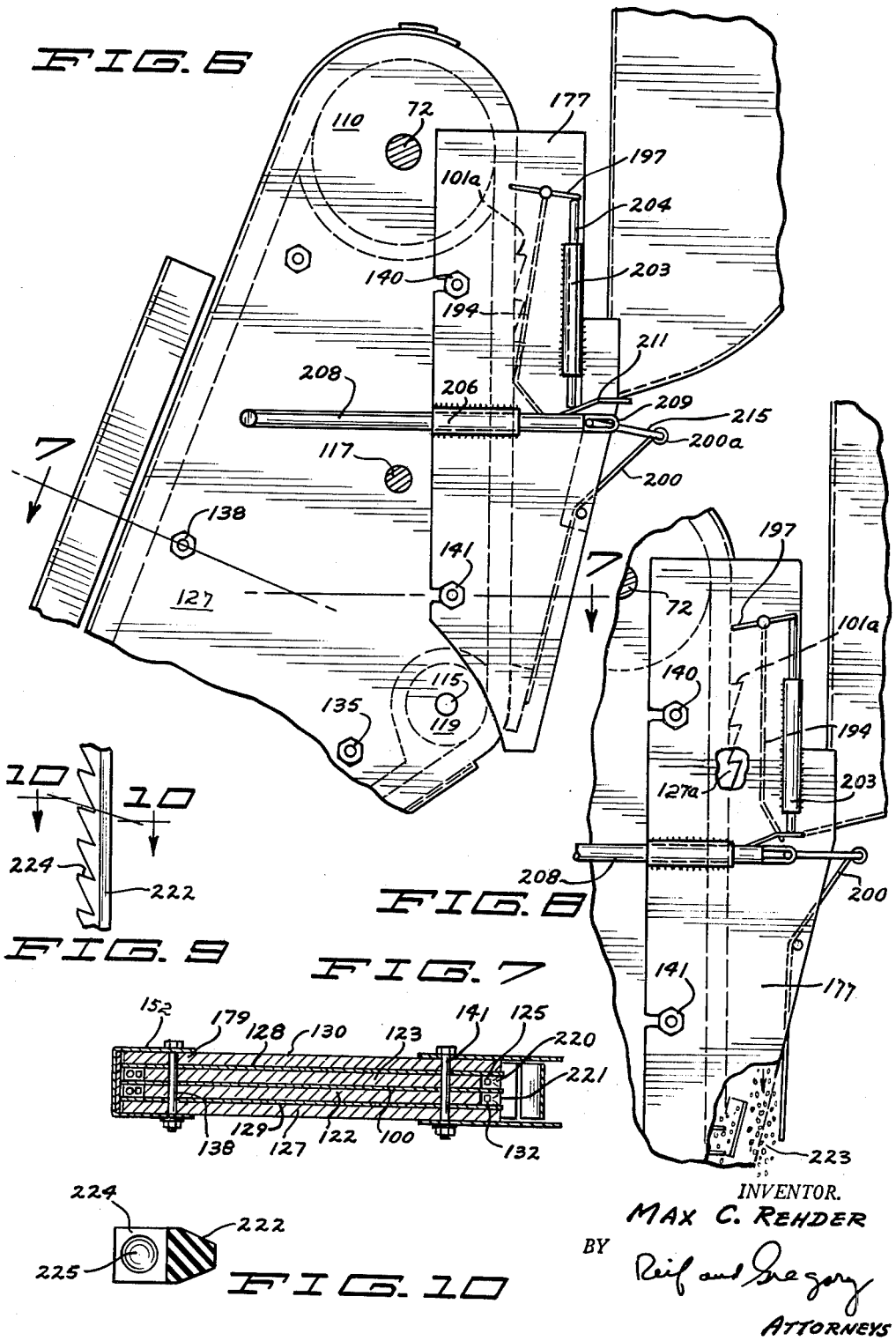

3,077,290
SEEDING APPARATUS
Max C. Rehder, 510 7th Ave. S., Moorhead, Minn.
Filed Sept. 24, 1959, Ser. No. 842,064
5 Claims. (Cl. 222—56)

This invention relates to an improvement in seeding apparatus and more particularly to seeding apparatus embodying a metering device adapted to accurately receive and convey out of a hopper and deposit for planting individual sugar beet seeds. It is desirable to have said seeds planted at regular intervals to avoid the need for a subsequent thinning of sugar beet plants.

Sugar beet seeds are of small size and are very light in weight. Such seeds are generally retained in a hopper of substantial size and some type of agitation is commonly provided to prevent the seeds from becoming packed to permit them to be more easily conveyed from a hopper by a seed carrying means. When seeds are retained in a hopper in a large quantity with the presence of agitation, there is substantial seed damage from crushing, particularly with seeds as fragile as sugar beet seeds. Further, there is a substantial percentage of foreign material mixed in with the seeds. This material tends to accumulate at the bottom of the hopper and unless discharged periodically this material will become planted.

It is desirable to have an auxiliary or secondary hopper of smaller size than a primary hopper and through which a seed conveying means may move to receive seeds therefrom without the need of agitation to keep the seeds from becoming packed and with very little likelihood of seeds becoming crushed from being in a packed condition and from which impurities or foreign material may be discharged at quite frequent intervals.

It is an object of this invention therefore to provide a seeding apparatus adapted to have a primary and a secondary hopper for containing seeds to be conveyed out of said secondary hopper for planting.

It is another object of this invention to provide a seeding apparatus having a seed conveying means adapted to receive and convey individual sugar beet seeds from a seed hopper to deposit the same for planting.

It is a further object of this invention to provide a seeding apparatus having an auxiliary hopper adapted to be fed by a primary hopper and means for automatically controlling the supply of seed to said auxiliary hopper.

It is a still further object of this invention to provide a seeding apparatus having a seed conveying means comprising an endless flexible chain comprising link portions, said link portions respectively being adapted to receive and convey a single sugar beet seed.

It is another object of this invention to provide a seeding apparatus comprising a secondary hopper, means for conveying seed from said secondary hopper for planting, said secondary hopper comprising an inlet through which seeds are fed from a primary hopper, and a closure means for said inlet responsive to the volume of seed in said auxiliary hopper for controlling the volume of seed in said hopper.

It is a further object of this invention, in connection with a seed apparatus, to provide an auxiliary hopper having an inlet therein adapted to be fed from a primary hopper, an outlet in said auxiliary hopper for discharging foreign material therefrom, and means for simultaneously closing said inlet and opening said outlet to discharge from said auxiliary hopper.

These and other objects and advantages of the invention will be fully set forth in the following description made in connection with the accompanying drawings in which like reference characters refer to similar parts throughout the several views and in which:

FIG. 1 is a view in side elevation of a seeding apparatus embodying the applicant's invention;

FIG. 2 is a top plan view of applicant's seeding apparatus;

FIG. 3 is a fragmentary view in vertical section on an enlarged scale taken on line 3—3 of FIG. 2 as indicated by the arrows;

FIG. 4 is a plan view on an enlarge scale of a blank for forming a link of an endless chain used in connection with the applicant's invention;

FIG. 5 is a combination view in top plan and side elevation of the operative relation of adjacent links of the endless chain used in connection with the applicant's invention, with some portions shown in dotted line;

FIG. 6 is a fragmentary diagrammatic view on an enlarged scale of the hopper construction of the applicant's invention showing detail thereof on an enlarged scale and showing some portions in dotted line;

FIG. 7 is a view in horizontal section taken on line 7—7 of FIG. 6, as indicated by the arrows;

FIG. 8 is a fragmentary view similar to FIG. 6 showing in dotted line an alternate position of a portion of applicant's hopper structure;

FIG. 9 is a fragmentary view in side elevation of a modification of an endless belt construction; and FIG. 10 is a view in horizontal section taken on line 10—10 of FIG. 9 as indicated by the arrows.

Referring to the drawings, like reference characters refer to identical parts throughout the several views. With reference to FIGS. 1 and 2, a basic frame 10 is shown comprising L-shaped longitudinally extending transversely spaced frame members 12 and 13 having horizontal outwardly extending flange portions 12a and 13a respectively. Journaled between said frame members at one end thereof on a shaft 15 is a packing wheel 17 of a commonly used type. Extending forwardly of the other end of said frame members respectively are auxiliary frame members 19 and 20 secured to said frame members 12 and 13 by bolts 21 and 22. Said bolts 22 are disposed through vertically elongated slots 19a and 20a of which only 19a is indicated in FIG. 1, thus providing pivotal adjustment for said members 19 and 20. Journaled between said members 19 and 20 on a shaft 24 are a pair of pneumatic wheels 26 of a commonly used type for packing or closing a furrow.

In practice, a number of the basic frame units 10 will be hitched in a side by side arrangement to a suitable rig which may be drawn by any suitable means. Such an arrangement forms no part of the invention here disclosed. Said frame unit 10 here shown is indicated as being hitched to a connecting bar 30 of such a rig with the connecting means comprising a pair of spaced flat frame members 32 and 33 pivoted at one end by bolts 35 to angled upstanding lugs 36 respectively secured to said flanges 12a and 13a by suitable means, such as by rivets 37. Said members 32 and 33 are journaled at their free ends to a tubular shaft 40 through which said connecting bar 30 is disposed. Said connecting bar 30 is here indicated as being hexagonal in cross section with said shaft 40 having a hexagonal bore therethrough whereby said bar and said shaft are unitary in operation. As above indicated, said connecting bar will be adapted to operatively connect a number of said frame units 10 and will be secured to a means for pulling the same, such as a tractor, which forms no part of the present invention, but the connecting bar 30 is indicated as being secured to connecting members 41 and 42 which will extend as to a tractor. Integral with said shaft 40 by means of a tubular end portion 43 disposed thereabout and secured thereto by a set screw 44 is an inwardly extending plate member 45. Said plate member 45, said shaft 40, said connecting bar 30 and the connecting members 41 and 42 will be unitary in operation. Extending inwardly horizontally from said frame members 32 and 33 at right angles thereto are plate members 47 and 48 overlying said plate member 45. Disposed upwardly through said plate member 45 and respectively through said plate members 47 and 48 are bolts 49 and 50 having mounted thereon coiled springs 51 and 52 retained thereon by washer equipped nuts 53 and 54. Thus a resilient springy connection is effected between said frame 10 and the connecting bar 30 with the parts associated therewith for moving said frame 10.

Mounted on said frame 10 substantially centrally between said wheels 17 and 26 is a seeding mechanism 55.

Upstanding from said frame 12 is a frame member 67 secured by bolts 68 and supporting at its upper end a bearing block 69 having journaled therein a stub shaft 72 adapted for operative engagement with said seeding mechanism 55, as will be described.

Carried on said shaft 72 is a driven pulley 73 formed as a U-pulley, which type has been found to be satisfactory in practice. Carried on said shaft 15 is a driving pulley 75 in alignment with said pulley 73, and passing over said pulleys is a V-belt 77. The rotation of said wheel 17 will serve as a driving means for said pulley 75. Upstanding from the flange portions of said frame members 12 and 13 and secured thereto by bolts 81 adjacent said wheels 26 are transversely aligned bars 83 and 84 having mounted therebetween a primary hopper 87 being secured by bolts 90. Said hopper is here shown to be substantially rectangular in plan having a straight front wall 92 and an inclined rear wall portion 93 converging to form an outlet 95.

Referring to the seeding mechanism 55, and particularly to FIGS. 3, 6-8, said mechanism comprises a center plate member 100 here shown to be substantially triangular in form and preferably formed of a rust resistant rigid sheet material, such as brass plate material. Said plate member 100 has its longest side 101 disposed in substantially a vertical direction with its shortest side 102 being disposed at an angle of approximately 45° with its hypotenuse or third side 103 being in a forward inclined position. Said plate member 100 is here formed having a substantially rounded upper end portion 106 having mounted thereon at either side thereof spaced somewhat inwardly from the periphery thereof sprockets 109 and 110 mounted on the portion of said shaft 72 extending through said plate member 100 and through said seeding mechanism, as indicated in FIG. 2.

Journaled on either side of said plate member 100 and spaced inwardly from the periphery thereof at corners 112 and 113 on stub shafts 115 and 116 are roller type pulleys 118—119 and 120—121 respectively. Pulley 121 is not shown. Overlying either side of said plate member 100 are spacing members 122 and 123 having their end portions cut out to accommodate said pulleys 109, 110, 118, 119, 120 and 121 and being spaced inwardly from the periphery of said plate member 100, as indicated in FIG. 3. Formed in the upper left somewhat above the center edge portion of said side 101, as indicated in FIG. 3, are upwardly and outwardly projecting offset or tooth-like projections forming a projecting portion 101a with said projecting portion extending somewhat beyond the peripheral continuation of said side 101.

Adapted to pass over said pulleys 109, 118 and 120 is an endless link chain 125, and adapted to pass over said pulleys 110, 119 and 121 is an endless link chain 132. Respectively overlying said plate members 122 and 123 and being of the same size as said plate member 100 are cover plate members 127 and 130 here indicated as being formed of a material such as pressed board as are said spacer members 122 and 123, and respectively disposed therebetween are thin rigid plates 128 and 129 of the size of said plate member 100, whereby said endless link chains 125 and 132 in passing over their respective pulleys travel through recessed portions or channels. Cover plates 127 and 130 and said plates 128 and 129 respectively will have tooth projecting portions aligned with said portions 101a.

Said cover plate members 127 and 130 and the plate members therebetween may be secured together in any suitable manner and are indicated here as being secured by bolts 135—141. Said bolts are here indicated as being formed as fully threaded headless bolts so that each of the spacer and cover plate members may be respectively secured by recessed nuts. Overlying the side 103 of plate member 100 from a point at the upper end portion 106 and extending to a point substantially at the lower end of said side 103 and overlying the adjacent edge portions of cover plates 127 and 130 is a substantially U-shaped channel member 143 forming a cover member and being secured in place by U-brackets 144, 145 and 146.

Overlying substantially the full length of side 102 of said plate member 100 and the adjacent edge portions of said outer plate members 127 and 130 is a channel-shaped guard member 152 secured to said bolts 135 and 136 by U-straps 153 and 154.

Referring to FIGS. 4 and 5, applicant's link chains 125 and 132 comprise a novel link construction consisting of links 156 here shown to be wing-shaped in blank form having a central portion 157 and wing portions 158 and 159. Extending forwardly of said central portion is a plate-like portion 160 having a substantially circular depression 160a therein forming a receptacle adapted to contain a single seed, and in the instant case a single sugar beet seed. Centrally of said last mentioned portion, at the rear of said plate portion 160 is a slot 161. Said wing portions and the central portion of said link 156 adjacent either end of said slot are folded downwardly at right angles to said central portion and said wing portions are again folded at right angles to have adjoining side edges, and said wing portions are then reversely bent upwardly in the direction of said plate-like portion 160 to form an elongated loop 162 having a small opening at its upper end portion whereby said loop is adapted to be disposed upwardly through said slot 161 of an adjacent link, and thus the chain is formed.

An essential portion of applicant's seeding mechanism is formed by the auxiliary hopper 175. While said hopper may take various specific forms, it is here indicated as being formed of substantially rigid sheet material having parallel sides 176 and 177, as indicated in FIG. 7, and having an inner open side 179 with said side having rectilinear front edge portions having aligned pairs of vertically spaced horizontally disposed open-ended slots 180 and 181 therein.

Said sides 176 and 177 are partially turned inwardly at their upper rear portions to form an enclosed rear wall portion 183. Adjacent the lower end of said rear wall portion 183 there is thus formed an offset portion 185. Said sides 176 and 177 taper at their rear portions below said offset portion and also at their lower front portions to form a bottom portion 188 of small width.

Said offset portion 185 has disposed therebetween a plate member 190 extending downwardly for some distance and being recessed therein and being secured to the sides of said offset portion as by welding, and having an upper lip portion 191 inclined upwardly and outwardly to form an inlet 192 together with the lower end of said rear wall portion 183. Adjacent the lower portion 188 and recessed therein is a flat plate stop member 193.

Pivoted at the upper portion of said hopper 175 adjacent said rear wall portion 183 is a depending plate member 194 secured to a shaft 195 journaled between said sides 176 and 177. Said plate member 194 has a rearwardly inclined lower end portion 196 which when said plate member is swung rearwardly acts as a closure for said inlet 192. Secured to said shaft 195 at the outer side of side 177 is an arm 197 which is adapted to be inclined downwardly rearwardly when said plate member 194 is in open position.

Pivoted between said sides 176 and 177 adjacent the lower end of said plate member 190 on a shaft 197 is an elongated plate member 198 having a straight depending portion 199 normally pressing at its lower end portion against stop member 193 and having an upper outwardly inclined upper end portion 200. Disposed about said shaft 197 is a spring member 201 adapted to urge said plate member 198 in a position with its lower end portion pressing against said stop member 193. Said spring member 201 is of a common type having one free end pressing against the depending portion of plate member 198 and its other free end pressing against the side portion 190.

With reference to FIGS. 6 and 8, secured to side 177 in vertical alignment with the rear end portion of said arm 197 is a vertically disposed sleeve 203 having freely movable therein and extending outwardly at either end thereof a rod 204. A horizontally disposed sleeve 206 is secured to said side 177 spaced downwardly somewhat from the lower end of sleeve 203, and having its leading edge spaced forwardly of a vertical extension of said sleeve 203. Slidably disposed through said sleeve 206 is an elongated rod 208 having a loop 209 formed at the end thereof adjacent said sleeve 203 or rod 204. Secured to the upper side of said rod 208 at the end portion thereof above said loop 209 is a cam plate 211. Said cam plate may be secured to said rod in any suitable manner, such as welding. Said cam plate 211 will be adapted to engage the lower end portion of said rod 204 to raise the same upwardly against the adjacent end of the arm 197 when said rod 208 is moved forwardly. Formed at the upper free end of said plate portion 200 is a loop 200a through which is disposed a right-angled crank 215 having one end journaled in said loop 200a and having its crank portion disposed through said loop 209 whereby when said rod 208 is moved forwardly the upper end portion of plate 198 will be urged forwardly against tension of said spring 201.

Said seeding mechanism 55 is mounted in operating position in said frame 10, as indicated in FIG. 1, and is held in said position by bolt 117 passing through said upstanding plate 67 and a plate 66 oppositely thereof upstanding from said frame member 13. Said shaft 72 stabilizes said seeding mechanism. A furrow opening shoe 217 will be secured to said frame 10 in a suitable manner with said shoe here being shown to be convexly formed to be disposed about the lower end portion 113 of said seeding mechanism 55 for preparing a furrow into which seeds will be dropped from said chains 125 and 132.

In operation, the primary hopper 87 will be filled with seeds here indicated by the character 220. From the primary hopper said seed 220 will pass by gravity through the outlet 95 of the primary hopper 87 and through the inlet 192 of the auxiliary hopper 175 to fill said auxiliary hopper to the point where said seed will be mounted up behind the swinging plate 194 and move the same forwardly to close the inlet 192.

The rotation of wheel 17 will through intervening pulleys rotate the endless chains 125 and 132 which will move upwardly through said auxiliary hopper 175. Said chains may be positioned to have their respective links in transverse alignment so that two seeds at a time may be conveyed out of said hopper 175 and deposited for planting, or said chains may be positioned to have their respective links in alternating or offset relation so that said seed from said respective chains will be deposited alternately for planting as may be desired. The lower recessed end portion of said hopper 175 and more specifically the stop plate 193 will be so closely adjacent to the links of said chains 125 and 132 as to form a lower end closure through which seed will not fall and yet there is just sufficient clearance for said endless chains to move upwardly thereby. Said chains in moving upwardly through said auxiliary hopper 175 will respectively receive or gather into the depressions of said plate portions 130, single seeds which will ride up through said hopper on said plate portions and will drop by gravity when carried to a point beyond the upper end portion of the travel of said endless chain. Said seed will drop freely supported by the adjacent surfaces of the links of said chain on its downward travel to the point where the seed is discharged into a furrow below the lower end portion of the seeding mechanism, as indicated in FIG. 3.

As is obvious from the structure described, said chains 125 and 132 will be moving in channels here indicated by the characters 220 and 221, with reference to FIG. 7, and said chains will be nicely confined within said channels. It is possible within the confined area of said channels for more than one seed to be loaded onto the plate portion 160 of the links 156. One seed may be nicely seeded in the depression 160a and another lodged thereabove or adjacent thereto. When said link chains move past the offset or projecting portions 101a at the upper central portion of the side 101 of the center plate 100 and the projecting portions at either side thereof, said additional seeds will have no side support, as from the channel walls, and they will tend to engage said projecting portions such as the undersides of said projecting portions which are inclined upwardly and outwardly to become dislodged and said additional seeds will tumble back into the hopper. This has been found to be very effective in permitting only one seed to be conveyed within each link which results in accurate planting. The speed of said chains will determine the rate at which the seeding operation may be carried out. The packing wheels 26 will cover the furrows made in moving forwardly.

There is generally found to be a certain percentage of foreign or waste material in seed and this material accumulates at the bottom of a hopper. Applicant's auxiliary hopper 175 is of relatively small size adapted to receive a continuous supply of seed as required from the primary hopper 87. Periodically the waste material in said hopper 175 will be discharged. Referring to FIGS. 6 and 8, the rod 208 will be pulled forwardly whereby the cam plate 211 will move rod 204 upwardly against one end of the arm 197 to swing said plate 194 to a closed position shutting off further supply of seed from the primary hopper into the auxiliary hopper. As said rod 204 is being moved upwardly, said rod 208 moves the upper portion of plate member 198 against the tension of spring 201 to move the lower portion 199 of said plate away from said stop member 193 to form an outlet indicated by the character 223 at the bottom of said hopper through which the accumulation of waste or foreign material in said auxiliary hopper is discharged. Experience will determine at what intervals a sufficient amount of foreign material has accumulated to warrant its being discharged. The operation can be timed so that there will be very little seed present in the auxiliary hopper at the time of such discharge. Said rod 208 is so adapted that the cam plate 211 first urges the rod 204 upwardly to swing the plate 194 to a closed position prior to the time that the plate member 198 is urged to an open position. The length of the loop 209 at the rear end of the rod 208 is sufficient to permit the closing of the inlet 192 before any pull is effected of said plate 198 to form the outlet 223.

With reference to FIG. 9, there is shown another construction of an endless belt wherein there is shown a belt 222 formed of a molded material having formed therein land portions 224 respectively having formed therein depressions 225 of a size to receive therein only one seed, such as a sugar beet seed. Said endless belt 222 will have its free ends secured in any suitable manner and provide an inexpensive and easily formed endless belt member to be used in connection with applicant's seeding mechanism.

Thus it is seen that I have provided a seeding mechanism comprising an endless chain of simple and novel construction adapted to receive and convey for planting purposes individual seeds in connection with a self-filling hopper of relatively small size in which a sufficient amount of seed is contained on a continuous basis for planting purposes but in which the mass is not sufficient to cause any of the seed therein to become crushed, and the amount therein is of sufficiently small quantity to permit the endless chain used for moving said seed to move freely therethrough to receive and convey individual seeds without the need for agitation and whereby it is convenient with a minimum loss of good seed to discharge at intervals from said hopper accumulation of foreign material.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claims.

What is claimed is:

1. A seeding apparatus having in combination, a first hopper adapted to have a supply of seed therein, a second hopper of substantially smaller size than said first hopper, an inlet in said second hopper for communication with said first hopper for the passage of seed therethrough, means in said second hopper responsive to a certain supply of seed therein for closing said inlet, an outlet adjacent the bottom of said second hopper, a spring pressed plate member normally closing said outlet, and means in operative association with said first mentioned means and said plate member to simultaneously close said inlet and open said outlet against the pressure of said plate member whereby said last mentioned means is normally held by said plate member to be in inoperative position.

2. A seeding apparatus having in combination, a seeding mechanism comprising an elongated substantially triangular center plate member in a vertically disposed position, a pair of axially aligned sprockets at either side of said plate member adjacent an upper portion thereof, spaced pairs of rollers about said plate member at either side thereof, a spacer plate at either side of said center plate having cut-out portions to accommodate said sprockets and rollers and being of a size somewhat smaller than the size of said center plate, a cover plate respectively overlying each of said spacer plates and having a size substantially the same as the size of said center plate whereby a channel is formed at either side of said center plate, said sprockets and rollers extending into said channels, an endless chain in each of said channels passing over said sprockets and rollers, said chain comprising links having outwardly extending plate portions having central depressions therein respectively adapted to receive an individual seed therein with said plate portions being nicely confined within said channels, an upper portion of said center and cover plates having transversely aligned offset projections within a continuation of the peripheries of said center and cover plates whereby if any additional seeds are lodged between said links and supported by confinement within said channels, said additional seeds become dislodged by passing by said offset projections whereby only individual seeds are respectively conveyed by said links for planting, and a hopper removably secured to said seeding mechanism having portions overlying said cover plates whereby said chains pass through said hopper and said offset projections will be positioned adjacent an upper portion of said hopper, and means for driving said sprockets.

3. A seeding apparatus having in combination, a seeding mechanism comprising a substantially triangular plate-like member, a channel about the periphery of said member, a sprocket mounted on said plate-like member extending into said channel, a plurality of spaced rollers mounted on said plate-like member and extending into said channel, an endless chain disposed in said channel passing over said sprocket and said rollers, a hopper carried on said plate-like member and adapted to have said chain pass therethrough, a portion of the side walls of said channel adjacent the upper portion of said hopper having tooth-like projections contained within a peripheral continuation of said plate-like member, said chain comprising link portions respectively adapted to receive and convey individual seeds in passing through said hopper.

4. The structure set forth in claim 3, said links of said chain comprising outwardly extending plate-like portions disposed in a horizontal plane in moving through said hopper, said plate-like portions having a depression therein of a size adapted to receive and seat a single seed, said plate-like portions being nicely confined within said channel whereby if an additional seed may become lodged within said link structure, when said links pass by said tooth-like projections, said plate-like portions are free from the confinement of the channel walls and said additional seeds will be engaged by portions of said tooth-like projections and will become dislodged whereby only individual seeds will be respectively conveyed by said links out of said hopper for planting.

5. A seeding apparatus comprising a seeding mechanism having an endless chain comprised of a multiplicity of operatively connected links, said links respectively comprising a wing-shaped member having a central plate portion having a depression therein adapted to accommodate a single seed, said wing-shaped portions being bent into planes at right angles to the plane of said central portion and parallel to one another and being respectively curved inwardly longitudinally to reverse positions having their free ends reversely bent adjacent one another to form a loop, a slot in said central portion adjacent the rear of said depression whereby said loops are disposed through said slots to form an endless chain with said depression facing upwardly and said loop portion forming a movable supporting wall adjacent the rear of said depression.

References Cited in the file of this patent

UNITED STATES PATENTS

| 1,657,761 | Novelli | Jan. 31, 1928 |
| 2,276,382 | Francis | Mar. 17, 1942 |
| 2,376,304 | Anderson | May 15, 1945 |
| 2,536,790 | Weishaar | Jan. 2, 1951 |

FOREIGN PATENTS

| 354,777 | Germany | June 15, 1922 |
| 1,055,550 | France | Feb. 19, 1954 |